(12) United States Patent
Jagota

(10) Patent No.: US 11,620,483 B2
(45) Date of Patent: Apr. 4, 2023

(54) DISCOVERING SUSPICIOUS PERSON PROFILES

(71) Applicant: salesforce.com, inc., San Francisco, CA (US)

(72) Inventor: Arun Kumar Jagota, Sunnyvale, CA (US)

(73) Assignee: Salesforce, Inc., San Francisco, CA (US)

(*) Notice: Subject to any disclaimer, the term of this patent is extended or adjusted under 35 U.S.C. 154(b) by 371 days.

(21) Appl. No.: 16/745,878

(22) Filed: Jan. 17, 2020

(65) Prior Publication Data

US 2021/0224614 A1  Jul. 22, 2021

(51) Int. Cl.
*G06K 9/62* (2022.01)
*G06N 7/00* (2006.01)
*G06N 20/00* (2019.01)

(52) U.S. Cl.
CPC .......... *G06K 9/6277* (2013.01); *G06N 7/005* (2013.01); *G06N 20/00* (2019.01)

(58) Field of Classification Search
CPC ...... G06K 9/6277; G06K 9/624; G06K 9/626; G06K 9/6226; G06K 9/6265; G06K 9/6289; G06N 20/00; G06N 7/005
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Bobbak Safaipour
*Assistant Examiner* — Duy Tran
(74) *Attorney, Agent, or Firm* — Dergosits & Noah LLP; Todd A. Noah

(57) ABSTRACT

A model is trained to create a probability distribution of counts based on counts of distinct values stored by person profiles in a field. The model is trained to create another probability distribution of counts based on other counts of other distinct values stored by the person profiles in another field. The count of distinct values stored by a person profile in the field is identified. Another count of distinct values stored by the person profile in the other field is identified. A score is determined based on a cumulative distribution function of the count under the probability distribution of counts. Another score is determined based on the cumulative distribution function of the other count under the other probability distribution of counts. If the score and the other score combine in an overall score that satisfies a threshold, a message is output about the person profile being suspected of corruption.

20 Claims, 3 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,686,214 B1 * | 3/2010 | Shao .................. G06Q 40/08 235/382 |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,516,053 B1 * | 12/2016 | Muddu .................. H04L 41/22 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0208814 A1 * | 8/2008 | Friedlander ......... G06F 16/2458 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0198119 A1 * | 8/2013 | Eberhardt, III ........ G06N 20/00 706/12 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2017/0230418 A1 * | 8/2017 | Amar ..................... H04L 67/01 |
| 2019/0361853 A1 * | 11/2019 | Lutsaievska ......... G06Q 10/109 |
| 2019/0363958 A1 * | 11/2019 | Brunets .................... G06N 5/04 |

\* cited by examiner

DISCOVERING SUSPICIOUS PERSON PROFILES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data may become extremely complex and dynamic due to the many changes that individual customers go through over time. For example, a customer's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A typical approach to resolving these challenges is through the instantiation of a database system that functions as a master data management hub which stages, profiles, cleanses, enriches, matches, reconciles, and instantiates all customer related records to create a single person profile for each customer, which may be referred to as a master profile, and then provides access to these person profiles and their cross references to business applications. The database system can use the generated person profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their person profile, especially in the purchase record(s) of the relevant item, so as to enable the company's customer service department to process the service request more effectively. A multi-tenant database can create tens of millions of person profiles for each of hundreds of thousands of companies, which may be referred to as organizations or tenants.

A database management system can build each person profile by using a complex process known as fuzzy matching to link different records for the same person. However, in real-world scenarios some records will be matched incorrectly and some correct matches will be missed because record matching is not a problem with a perfect solution. A company needs to quickly discover any person profiles that were built from incorrect matches, which may be referred to as corrupted person profiles. Therefore, the company may enlist data stewards for the challenging task of discovering these corrupted person profiles among possibly millions of correctly built person profiles.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
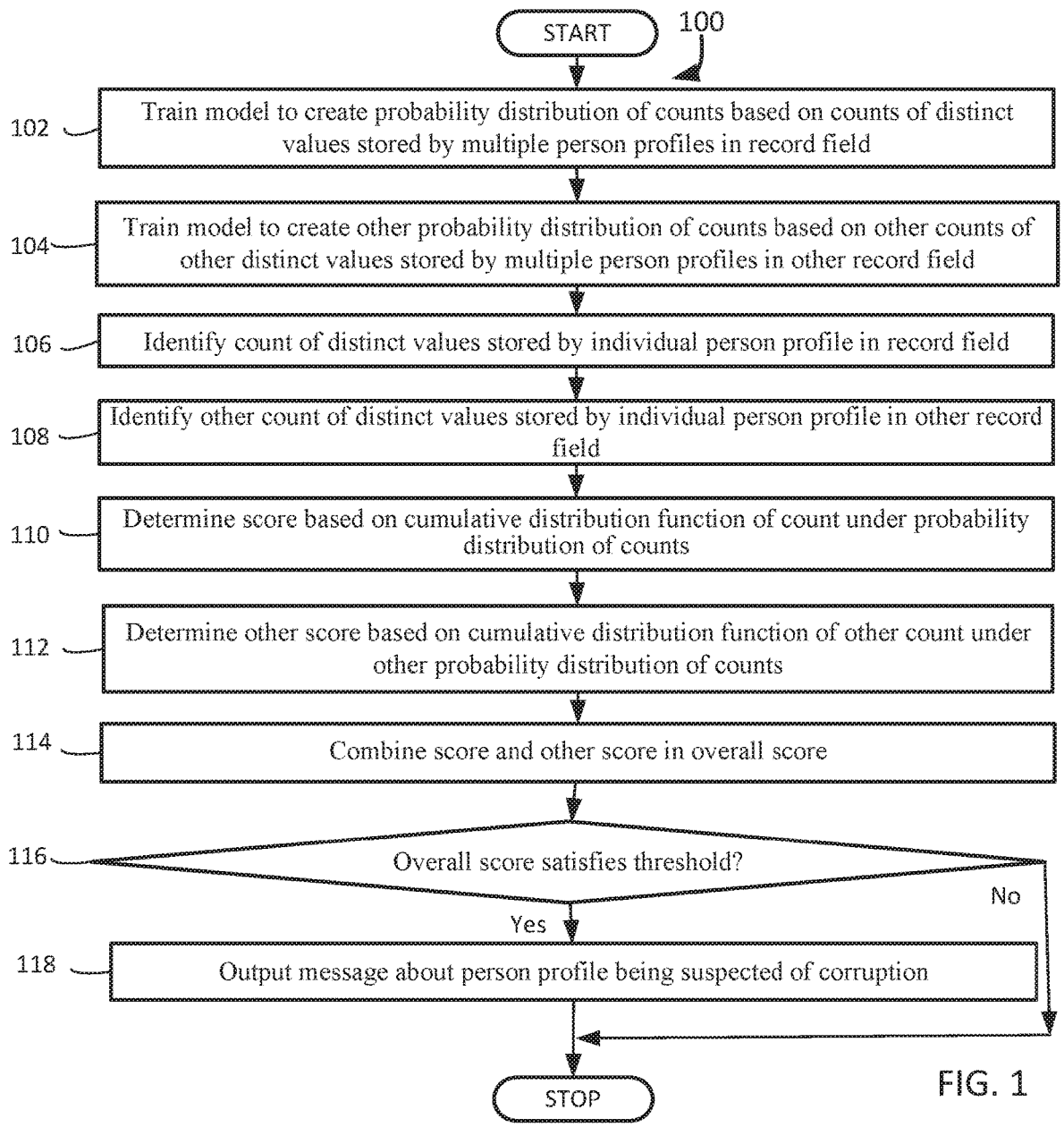
FIG. 1 is an operational flow diagram illustrating a high-level overview of a method for discovering suspicious person profiles, in an embodiment.

In accordance with embodiments described herein, there are provided methods and systems for discovering suspicious person profiles. A system trains a model to create a probability distribution of counts based on counts of distinct values stored by multiple person profiles in a record field. The system trains the model to create another probability distribution of counts based on other counts of other distinct values stored by the multiple person profiles in another record field. The system identifies the count of distinct values stored by an individual person profile in the record field. The system identifies another count of distinct values stored by the individual person profile in the other record field. The system determines a score based on a cumulative distribution function of the count under the probability distribution of counts. The system determines another score based on the cumulative distribution function of the other count under the other probability distribution of counts. If the score and the other score combine in an overall score that satisfies a threshold, the system outputs a message about the individual person profile being suspected of corruption.

For example, a customer resolution engine extracts features from a training set of Acme Corporation's 100K person profiles, and trains a model to build a probability distribution for the numbers of distinct email addresses in each person profile, which indicates that 66% of these profiles store 1 distinct email address, 33% of these profiles store 2 distinct email addresses, and 1% of these profiles store 3 distinct email addresses. The customer resolution engine also trains the model to build a probability distribution for the numbers of distinct phone numbers in each person profile, which indicates that 50% of these profiles store 1 distinct phone number, 33% of these profiles store 2 distinct phone numbers, 16% of these profiles store 3 distinct phone numbers, and 1% of these profiles store 4 distinct phone numbers. The customer resolution engine identifies that Chris Carter's person profile stores 4 distinct email addresses and 3 distinct phone numbers. The customer resolution engine applies the cumulative distribution function to the count of Carter's 4 email addresses under the probability distribution for the number of email addresses to determine the unusualness score of 2.76 for the count of Carter's 4 email addresses. The customer resolution engine applies the cumulative distribution function to the count of Carter's 3 phone numbers under the probability distribution for the number of phone numbers to determine the unusualness score of 0.77 for the count of Carter's 3 phone numbers. Since the unusualness score of 2.76 for the count of Carter's 4 email addresses and the unusualness score of 0.77 for the count of Carter's 3 phone numbers combine in an overall score of 3.53 for Carter's profile, and the overall score of 3.53 is greater than an unusualness threshold of 3.0, the customer resolution engine outputs a message about Chris Carter's person profile being suspected of corruption.

Systems and methods are provided for discovering suspicious person profiles. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a method for discovering suspicious person profiles. Next, systems for discovering suspicious person profiles will be described with reference to example embodiments.

While one or more implementations and techniques are described with reference to an embodiment in which discovering suspicious person profiles is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A person profile may be represented as a tuple over multi-valued record fields, X1, X2, . . . , Xn. Examples of record fields are first_name, last_name, email, phone, street address, and city. Any of a person profile's record fields may store multiple values. For example, the record fields for Ann Davis' person profile store her work, fax and mobile telephone numbers, her work and personal email addresses, and her maiden name Adams and her after-marriage name Davis. The various features in a person profile, which are assumed to be discrete-valued, may be denoted as $Y_1, Y_2, \ldots, Y_m$, and any feature's value may be missing. A system's customer resolution engine can extract features from a training set of a company's typically large number of person profiles to build a rich model of person profile shapes. These extracted features can include the number of records that contributed to a person profile. the number of distinct phone numbers in the profile, the number of distinct area/region codes in the various phone numbers in the profile, the number of distinct email addresses in the profile, the number of distinct domains in the various email addresses in the profile, and the number of distinct last names in the profile.

The system identifies the counts of distinct values stored in various record fields by a training set's person profiles and uses these counts to train a model that creates a probability distribution of counts for each record field. For example, a customer resolution engine extracts features from a training set of Acme Corporation's 100K person profiles, and trains a model to build a probability distribution for the numbers of distinct phone numbers in each person profile, which indicates that 50% of these profiles store 1 distinct phone number, 33% of these profiles store 2 distinct phone numbers, 16% of these profiles store 3 distinct phone numbers, and 1% of these profiles store 4 distinct phone numbers. Continuing the example, the customer resolution engine trains the model to build a probability distribution for the numbers of distinct email addresses in each person profile, which indicates that 66% of these profiles store 1 distinct email address, 33% of these profiles store 2 distinct email addresses, and 1% of these profiles store 3 distinct email addresses. Further to the example, the customer resolution engine trains the model to build a probability distribution for the numbers of distinct last names in each person profile, which indicates that 80% of these profiles store 1 distinct last name and 20% of these profiles store 2 distinct last names.

A count can be a total number of items. A distinct value can be a unique symbol on which operations are performed by a computer. A record field can be a part of a storage of at least one value in a persistent form, which represents data for something. A person profile can be a representation of information relating to particular characteristics of a human. A model can be a formalized way to approximate reality. A probability distribution can be a mathematical function that provides the likelihoods of occurrence of different possible outcomes.

Since a corrupted person profile will link together records for different people, such a profile is predisposed towards many-valued features. Therefore, the more distinct values stored for a feature by a person profile, the more suspicious the person profile will generally be. For example, if 99% of Acme Corporation's 100K person profiles store 1-3 phone numbers, then a person profile that stores 15 different phone numbers is a suspicious person profile. The system learns notions of usual and unusual that are specific to each feature. For example, a model may learn that a person profile which stores 2 distinct phone numbers is usual and that a profile which stores 2 distinct last names is unusual.

The system uses the learned model to identify person profiles that have unusual shapes, which may be referred to as suspicious person profiles because such profiles are suspected of being more likely to be corrupted person profiles than person profiles that have more usual or normal shapes. Since the model learns the boundaries of usual shapes versus unusual shapes from the training data, the model has the ability to learn company-or tenant-specific notions of usual shapes and unusual shapes through company or tenant-specific training. The system generates a suspiciousness score for a person profile, which indicates how much the system suspects the profile of being a corrupted person profile. The suspiciousness score for a person profile is based on the values in person profile's feature vector $y=(y_1, y_2, \ldots, y_m)$. The suspiciousness score function is:

$$S(y)=\Sigma_{i=1}^{m} S_i(y_i) \quad \text{(Equation 1)}$$

$$\text{where } S_i(y_i)=-\log(1-P_{i,cum}(y_{i-1})) \text{ if } y_i \text{ is not null} \quad \text{(Equation 2).}$$

$S_i(y_i)$ is set to 0 when $Y_i$'s value is missing and $y_i$ is null, so that a missing value for $Y_i$ does not influence the score $S_i(y_i)$. Equation 2's formula $P_{i,cum}(x)$ is the cumulative distribution $\Sigma_{c=0}^{x} P_i(c)$. The system estimates the probability distribution $P_i$ over values of $Y_i$ from a training set. Specifically, for those records that have a value for feature $Y_i$, $P_i(x)$ is the fraction in which $Y_i$ equals x. The larger the value $y_i$ is of the feature $Y_i$, the smaller the value will be for Equation 2's formula $1-P_{i,cum}(y_{i-1})$, and the larger the score will be for $S_i(y_i)$.

Equation 2's formula $1-P_{i,cum}(y_{i-1})$ may be considered as the P-value of $y_i$ under the probability distribution $P_i$, based on the premise that a person profile that stores too many values of a certain feature is a suspicious person profile, such as a person profile that stores multiple last names. What constitutes "too many values" depends on the feature and on a company's person profiles. For example, a person profile that stores 2 distinct email addresses may not be a suspicious profile, but a person profile that stores 2 distinct last names might be a suspicious profile. In another example, some companies might not allow any person profile to store multiple email addresses, but other companies might allow each person profile to store multiple email addresses. After being trained on a data set, the system can apply a model to the same data set to discover suspicious person profiles by scoring each profile in a second pass.

The system identifies the count of distinct values stored in various record fields by a person profile. For example, the customer resolution engine identifies that Bob Brown's person profile stores 1 distinct phone number, 1 distinct email address, and 1 distinct last name. In another example, the customer resolution engine identifies that Chris Carter's person profile stores 3 distinct phone numbers, 2 distinct email addresses, and 1 distinct last name.

After modeling the probability distributions for multiple person profiles' various record fields, the system determines a score for each of a person profile's record fields by applying a cumulative distribution function to the number of distinct values in a record field under the probability distribution of counts that was modeled for the record field. For example, the customer resolution engine applies the cumulative distribution function to the count of Brown's 1 minus 1 ($y_{i-1}$) phone number under the probability distribution for the number of phone numbers, which determines that the count of 0 phone numbers cumulatively represent 0% under the model, which may be expressed as 0 for $P_{i,cum}(y_{i-1})$. Next, the customer resolution engine uses Equation 2's formula to calculate $S_i(phone_1)=-\log(1-P_{i,cum}(y_{i-1}))=-\log(1-0)=-\log(1.0)=0$ as the unusualness score for the count of Brown's 1 phone number. A score can be a rating or a grade. A cumulative distribution function can be the sum of the values, for all outcomes, which are less than or equal to specific value, Continuing the example, the customer resolution engine applies the cumulative distribution function to the count of Brown's 1 minus 1 ($y_{i-1}$) email address under the probability distribution for the number of email addresses, which determines that the count of 0 email addresses cumulatively represent 0% under the model, which may be expressed as 0 for $P_{i,cum}(y_{i-1})$. Next, the customer resolution engine uses Equation 2's formula to calculate $S_i(email_1)=-\log(1-P_{i,cum}(y_{i-1}))=-\log(1-0)=-\log(1.0)=0$ as the unusualness score for the count of Brown's 1 email address. Further to the example, the customer resolution engine applies the cumulative distribution function to the count of Brown's 1 minus 1 ($y_{i-1}$) last_name under the probability distribution for the number of last names, which determines that the count of 0 last names cumulatively represent 0% under the model, which may be expressed as 0 for $P_{i,cum}(y_{i-1})$. Next, the customer resolution engine uses Equation 2's formula to calculate $S_i(last\_name_1)=-\log(1-P_{i,cum}(y_{i-1}))=-\log(1-0)=-\log(1.0)=0$ as the unusualness score for the count of Brown's 1 last name.

In another example, the customer resolution engine applies the cumulative distribution function to the count of Carter's 3 minus 1 ($y_{i-1}$) phone numbers under the probability distribution for the number of phone numbers, which determines that the count of 2 phone numbers cumulatively represent 83% under the model, which may be expressed as 0.83 for $P_{i,cum}(y_{i-1})$. Next, the customer resolution engine uses Equation 2's formula to calculate $S_i(phone_3)=-\log(1-P_{i,cum}(y_{i-1}))=-\log(1-0.83)=-\log(0.17)=0.77$ as the unusualness score for the count of Carter's 3 phone numbers. Continuing the example, the customer resolution engine applies the cumulative distribution function to the count of Carter's 2 minus 1 ($y_{i-1}$) email addresses under the probability distribution for the number of email addresses, which determines that the count of 1 email address cumulatively represents 66% under the model, which may be expressed as 0.66 for $P_{i,cum}(y_{i-1})$. Next, the customer resolution engine uses Equation 2's formula to calculate $S_i(email_2)=-\log(1-P_{i,cum}(y_{i-1}))=-\log(1-0.66)=-\log(0.34)=0.47$ as the unusualness score for the count of Carter's 2 email addresses. Further to the example, the customer resolution engine applies the cumulative distribution function to the count of Carter's 1 minus 1 ($y_{i-1}$) last name under the probability distribution for the number of last names, which determines that the count of 0 last names cumulatively represents 0% under the model, which may be expressed as 0 for $P_{i,cum}(y_{i-1})$. Next, the customer resolution engine uses Equation 2's formula to calculate $S_i(last\_name_1)=-\log(1-P_{i,cum}(y_{i-1}))=-\log(1-0)=-\log(1.0)=0$ as the unusualness score for the count of Carter's 1 last name.

Following the generation of scores for each of an individual person profile's various record fields, the system combines each of these scores into an overall score for the person profile. For example, the customer resolution engine combines the unusualness score of 0 for the count of Brown's 1 phone number, the unusualness score of 0 for the count of Brown's 1 email address, and the unusualness score of 0 for the count of Brown's 1 last name to result in the overall score of 0 for Brown's profile. In another example, the customer resolution engine combines the unusualness score of 0.77 for the count of Carter's 3 phone numbers, the unusualness score of 0.47 for the count of Carter's 2 email addresses, and the unusualness score of 0 for the count of Carter's 1 last name to result in the overall score of 1.24 for Carter's profile. An overall score can be a comprehensive rating or a grade.

Having determined an individual person profile's overall score, the system determines whether the overall score for the person profile satisfies a threshold. For example, the customer resolution engine determines whether the overall score of 0 for Brown's profile is greater than an unusualness threshold of 1.0. In another example, the customer resolution engine determines whether the overall score of 1.24 for Carter's profile is greater than an unusualness threshold of 1.0. A threshold can be the magnitude that must be met for a certain result to occur.

If the overall score for an individual person profile satisfies a threshold, the system outputs a message about the person profile being suspected of corruption. For example, since the overall score of 1.24 for Carter's profile is greater than the unusualness threshold of 1.0, the customer resolution engine outputs a message about Carter's person profile being suspected of corruption. A message can be a recorded communication sent to or left for a recipient. Corruption can be the process by which somethings are changed from its original use to a use that is regarded as erroneous.

The system could use Equation 1 for a feature whose y-value is larger than any y-value in the training set to calculate a score of infinity, which could often be an undesirable score. For example, the system uses a training set of Acme Corporation's 100K person profiles that store 1-3 distinct email addresses to train a model, and then applies the trained model to a newly built person profile that stores 4 distinct email addresses to generate a score of infinity for the feature num-distinct-emails. While the new person profile that stores 4 distinct email addresses is unusual for the Acme Corporation's 100K person profiles, the degree of unusualness for this person profile is not infinite, nor is this profile as unusual as a person profile that stores 6 distinct email addresses. However, for this example the score functions in Equations 1 and 2 could not differentiate between a person profile that stores 4 distinct email addresses and a person profile that stores 6 distinct email addresses.

To address this issue that occurs when applying score functions to a training set's feature values does not result in scores that differentiate between significantly different feature values, the system can generate pseudo-counts off a suitable parametric distribution, such as the Poisson distribution: $P(y)=e^{-r}r^y/y!$. The Poisson distribution has the correct shape for modeling probability distributions of numbers of distinct values, peaking at a small positive integer (which the system can estimate) and decaying roughly exponentially at higher counts. The system can estimate the Poisson distribution parameter r as the mode of y in the training set, and then sample m values from the subsequently generated Poisson distribution, with the sampled m values becoming the virtual instances of the feature of interest that are represented by pseudo-counts. The system can calculate m as 10% of the number of person profiles in the training set. For example, if a training set has Acme Corporation's 100K person profiles, 66% of these profiles store 1 distinct email address, 33% of these profiles store 2 distinct email addresses, and 1% of these profiles store 3 distinct email addresses, then r is set to 1 because the mode is 1, and m is set to 10K because 10% of 100K is 10K. The system can use the Poisson distribution to generate pseudo-counts that smooth a probability distribution, and then add the relatively small number of pseudo-counts to the relatively large number of actual counts. The suspiciousness score function remains defined by Equation 1.

Therefore, a probability distribution of counts may include pseudo counts generated from a parametric probability distribution that is based on a parameter that is estimated from the probability distribution of counts. Continuing the example in which r is set to 1 and m is set to 10K, when y=0, $P(y)=e^{-r}r^y/y!=e^{-1}1^y/y!=e^{-1}1^0/0!=e^{-1}=0.3679$, which is multiplied by m=10K to produce 3,679 pseudo counts for y=0. When y=1, $P(y)=e^{-r}r^y/y!=e^{-1}1^y/y!=e^{-1}1^1/1!=e^{-1}=0.3679$, which is multiplied by m=10K to produce 3,679 pseudo counts for y=1. When y=2, $P(y)=e^{-r}r^y/y!=e^{-1}1^y/y!=e^{-1}1^2/2!=e^{-1}/2=0.1839$, which is multiplied by m=10K to produce 1,839 pseudo counts for y=2. When y=3, $P(y)=e^{-r}r^y/y!=e^{-1}1^y/y!=e^{-1}1^3/3!=e^{-1}/6=0.0613$, which is multiplied by m=10K to produce 613 pseudo counts for y=3.

When y=4, $P(y)=e^{-r}r^y/y!=e^{-1}1^y/y!=e^{-1}1^4/4!=e^{-1}/24=0.0153$, which is multiplied by m=10K to produce 153 pseudo counts for y=4. When y=5, $P(y)=e^{-r}r^y/y!=e^{-1}1^y/y!=e^{-1}1^5/5!=e^{-1}/120=0.0031$, which is multiplied by m=10K to produce 31 pseudo counts for y=5. When y=6, $P(y)=e^{-r}r^y/y!=e^{-1}1^y/y!=e^{-1}1^6/6!=e^{-1}/720=0.0005$, which is multiplied by m=10K to produce 5 pseudo counts for y=6. When y=7, $P(y)=e^{-r}r^y/y!=e^{-1}1^y/y!=e^{-1}1^7/7!=e^{-1}/5,040=0.0001$, which is multiplied by m=10K to produce 1 pseudo count for y=7. A pseudo count can be a total number of virtual items. A parameter can be a numerical factor forming one of a set that defines a system or sets the conditions of the system's operation. A parametric probability distribution be a mathematical function that provides the likelihoods of occurrence of different possible outcomes, which is based on a numerical factor forming one of a set that defines a system or sets the conditions of the system's operation.

Having calculated 10K pseudo counts for the y values 0 through 7, the system adds the 10K pseudo counts to the 100K counts of distinct email addresses to result in 110K counts under an augmented probability distribution for counts of email addresses. Now when the system applies Equation 2's cumulative distribution function to the new profile's count of 4 distinct email addresses under the augmented probability distribution, 190 pseudo counts have y values greater than or equal to y=4 (153 pseudo counts for y=4, plus 31 pseudo counts for y=5, plus 5 pseudo counts for y=6, plus 1 pseudo count for y=7) out of the of the 110K augmented counts, such that $P_4+P_5+P_6+P_7=0.00172$. Consequently, $S_i(email_4)=-\log(1-P_{i,cum}(y_{i-1}))=-\log(1-0.99827)=-\log(0.00172)=2.76$ as the unusualness score for the count of 4 email addresses under the new profile. If the system applied Equation 2's cumulative distribution function to a new profile's count of 6 distinct email addresses under the augmented probability distribution, only 6 pseudo counts have a y value greater than or equal to y=6 (5 pseudo counts for y=6, plus 1 pseudo count for y=7) out of the of the 110K augmented counts, such that $P_6+P_7=0.000054$. Consequently, $S_i(email_6)=-\log(1-P_{i,cum}(y_{i-1}))=-\log(1-0.999946)=-\log(0.000054)=4.27$ as the unusualness score for the count of 6 email addresses under the new profile. This example demonstrates that when a probability distribution has values for only 1-3 counts, the generation of pseudo counts from a parametric distribution function enable the score functions in Equations 1 and 2 to calculate unusualness scores which differentiate between a person profile that stores 4 distinct email addresses by generating a score of 2.76 and a person profile that stores 6 distinct email addresses by generating a score of 4.27.

Such an empirical distribution is potentially more accurate for the modeling, and significant amounts of training data are available. Smoothing is needed only for the right tail of the probability distribution, which may be off because of training set bias or due to a non-stationarity in the problem itself. A parametric distribution that is suitable for smoothing (such as Poisson) is better than a distribution without smoothing. For example, the probability distribution of the number of distinct email addresses in the training set is bimodal, such that half of the person profiles store 1 distinct email address and the other half of the profiles store 2 distinct email addresses. While a non-parametric probability distribution could model this bimodal feature, this distribution would have no data for the number of distinct email addresses that are greater than 2. A Poisson distribution with a mode at 1 (or 2) will roughly capture the exponential decaying probability of a person profile that stores more than 2 distinct email addresses, which is better than sharply truncating the probability to 0.0 for a person profile that stores more than 2 distinct email addresses.

While Equation 1's suspiciousness score function has the desirable capability of learning the boundaries of usual versus unusual solely from a training data set, thereby discovering feature-specific and company-specific or tenant-specific boundaries, the suspiciousness score function's accuracy can be improved further from human feedback. For example, a training set has Acme Corporation's 100K person profiles, 66% of these profiles store 1 distinct email address, 33% of these profiles store 2 distinct email addresses, and 1% of these profiles store 3 distinct email addresses. Even though the system generated and added pseudo-counts for the number of distinct email addresses, the system calculates a relatively high email suspiciousness score of 2.76 for Chris Carter's new person profile that stores 4 distinct email addresses, and a data steward subsequently indicates that this new profile is not a corrupted person profile. When the addition of pseudo counts does not sufficiently address this issue, possibly because the training set might be biased or the problem is non-stationary, the suspiciousness score function can learn from a data steward's action, such as by downgrading the degree of unusualness of scores for person profiles that store 4 distinct email addresses.

Therefore, Equation 1's suspiciousness score function may be generalized to leverage human feedback whenever such feedback is available, and to remain unchanged whenever such feedback is unavailable. For a person profile being scored, Equation 1 defines $s=(s_1, s_2, \ldots, s_m)$ as the vector of its feature scores, such that this profile's overall suspiciousness score is $s_1+s_2+\ldots+s_m$, which may be generalized to accommodate a mechanism to learn from human feedback. The human feedback may be modeled as training instances of the form (s, l), where l=0 denotes human feedback which specifies that a person profile is a correctly built profile and l=1 denotes human feedback which specifies that a person profile is a corrupted profile. Since this is a binary classification problem (based on the binary feedback of correctly built or corrupted), the overall suspiciousness score may be transformed via a sigmoid function:

$$\text{score}=g\Sigma_{i=1}^{m}s_i, \text{ where } g(x)=1/(1+e^{-x}) \quad \text{(Equation 3)}$$

So now the overall suspiciousness score is in the range [0, 1] and may be interpreted as the probability that the person profile is a corrupted person profile. For example, the customer resolution engine normalizes the overall suspiciousness score of 1.24 for Carter's profile=$1/(1+e^{-x})=1/(1+e^{-1.24})$, $=1/(1+0.29)=1/1.29=0.78$ normalized overall suspiciousness score for Carter's profile. Additionally, each individual score may be expressed as a normalized score when the system generates and outputs an explanation of the predicted overall suspiciousness score. For example, the customer resolution engine normalizes the unusualness score of 0.77 for the count of Carter's 3 phone numbers=$1/(1+e^{-x})=1/(1+e^{-0.77})$,$=1/(1+0.46)=1/1.46=0.68$ normalized score for 3 phone numbers. Continuing the example, the customer resolution engine normalizes the unusualness score of 0.47 for the count of Carter's 2 email addresses=$1/(1+e^{-x})=1/(1+e^{-0.47})$, $=1/(1+0.63)=1/1.63=0.61$ normalized score for 2 email addresses. Further to the example, the customer resolution engine normalizes the unusualness score of 0 for the count of Carter's 1 last name=$1/(1+e^{-x})=1/(1+e^{-0})=1/(1+1)=\frac{1}{2}=0.33$ normalized score for 1 last name. Completing the example, the customer resolution engine outputs the 0.68 normalized score for 3 phone numbers, the 0.61 normalized score for 2 email addresses, and the 0.33 normalized score for 1 last name to as an explanation for the overall score of 1.24 for Carter's profile. A normalized score can be a rating or a grade that is measured on a scale and that is then adjusted to a common scale.

Next, the learnable elements from human feedback may be introduced into Equation 2. The learnable element $w_0$ may be a soft version of a threshold on the overall suspicious score, such that the threshold may be tuned from human feedback. The remaining learnable elements are feature-specific weights $w_i$ that a machine-learning model can use to learn feature-specific relative influences on the overall probability of a person profile being a corrupted profile. Adding the learnable elements to Equation 2 yields:

$$\text{score}=g(-w_0+\Sigma_{i=1}^{m}w_is_i) \quad \text{(Equation 4)}$$

The system can train by learning Equation 2's unsupervised suspiciousness score function, transforming Equation 2 to Equation 3 to normalize the suspiciousness score to the range [0, 1], and then initializing $w_0$ to 0 and $w_i$ to 1 for $i \geq 1$. Next, the machine-learning model can adjust the weights, such as by using a stochastic gradient descent or the limited memory Broyden-Fletcher-Goldfarb-Shanno algorithm, from the human feedback, such as instances of the form (s, l). A stochastic gradient descent is an iterative method for optimizing an objective function with suitable smoothness properties by replacing the actual gradient (calculated from the entire data set) by an estimate thereof (calculated from a randomly selected subset of the data). The Broyden-Fletcher-Goldfarb-Shanno algorithm is an iterative method for solving unconstrained nonlinear optimization problems.

Therefore, a machine-learning model can respond to receiving human feedback that evaluates whether a historical person profile is corrupted by learning weights that correspond to each score, and then applying these weights to their corresponding scores which are the basis for the overall score. For example, the customer resolution engine responds to the data steward's action of downgrading the degree of unusualness of scores for the new person profile that stores 4 distinct email addresses by using a stochastic gradient descent to reduce the weight for the score based on the number of distinct email addresses, which results in a lower overall score for any subsequent person profiles that store 4 distinct email addresses. The human feedback may arrive incrementally over an arbitrary time span.

A machine-learning model can be a computer system that scientifically studies algorithms and/or statistical models to perform a specific task effectively by relying on patterns and inference instead of using explicit instructions. Human feedback can be information provided by a person about reactions to a performance of a task, which is used as a basis for improvement. A historical person profile can be a representation of information that was related to particular characteristics of a human. A weight can be the ability of something to influence decisions or actions.

If the system generates a suspiciousness score that is based only on the number of a feature's distinct values, the score is not based on the feature's actual values. For example, if Ann's person profile stores the cities San Francisco and San Jose, and Bob's person profile stores the cities San Francisco and New York, the overall suspiciousness score for each of these profiles would be based on the same feature score for 2 distinct cities. However, Bob's person profile should be scored as more suspicious because the cities San Francisco and New York are less likely to co-occur in the same profile.

Therefore, the system can calculate the suspiciousness score using features $Y_1, Y_2, \ldots, Y_m$ that are based on the numbers of distinct values and additional features which may be denoted as $Z_1, Z_2, \ldots, Z_m$. Whereas $Y_i$'s value is a nonnegative integer, $Z_i$'s value is a set from a categorical universe $U_i$. For example, $Z_{city}$ equals {San Francisco, San Jose} for Ann's profile and {San Francisco, New York} for Bob's profile. If z denotes any subset of $U_i$ then $P_i(z)$ denotes the probability that z is a subset of the value of $Z_1$ in a randomly chosen profile. Therefore, $P_i(z)$ is the fraction of profiles in which all the feature values in z appear in $Z_1$, where $Z_1$ may have additional feature values in the profile. For example, $P_{cities}(\{San\ Francisco,\ New\ York\})$ is the fraction of person profiles that store both San Francisco and New York in the cities' feature. Since z is unusual if $P_i(z)$ is sufficiently low, the suspiciousness score for such feature values may be defined as:

$$S_i(z) = -\log P_i(z) \quad \text{(Equation 5)}$$

As in Equation 2, $S_i(z)$ is set to 0 when z's value is missing and z is null, so that a missing feature value for z does not influence the score $S_i(z)$. The scoring of such feature values now fits into Equation 1, and Equation 5 can be used instead of Equation 2 for such feature values. Therefore, the overall score may include an additional score that is based on a probability that distinct values stored by a person profile in a record field are stored by multiple person profiles in the same record field. For example, since 100 of Acme Corporation's 100K profiles store distinct city values that include {San Francisco, San Jose}, the customer resolution engine calculates the score $S_{city}$ for Ann's profile as $-\log P_i(z) = -\log P_{city}(100/100,000) = -\log P_{city}(0.001) = 3.0$. Continuing the example, since 1 of Acme Corporation's 100K profiles stores distinct city values that include {San Francisco, New York}, the customer resolution engine calculates the score $S_{city}$ for Bob's profile as $-\log P_i(z) = -\log P_{city}(1/100,000) = -\log P_{city}(0.00001) = 5.0$. A probability can be the likelihood of something happening or being the case.

To evaluate Equation 5 whenever needed, the system needs to record the probabilities $P_i(z)$ for every z that occurs as a subset of the value Z, that is in the training set at least once. Since the set of such z's can be significantly large, the system can use a lean approximation that records the probabilities of far fewer z's, which takes the form:

$$S_i(z) = \max_{z' \in t(z)} S_i(z') \quad \text{(Equation 6)}$$

Here t(z) denote a suitable subset of z. For example, t(z) is the collection of all subsets of z that have a cardinality of at most 2. The system truncates high cardinality subsets to identify only low-cardinality subsets which will be the only subsets for which the system tracks probabilities, thereby producing a lean model. There can be far fewer subsets of singletons and pairs that occur at least once in a large data set compared to all subsets that appear at least once. The lean model is still potentially rich, in terms of its ability to detect value sets that are highly unusual, because if $S_i(z')$ scores very high for a certain set z', then $S_i(z) \geq S_i(z')$ for every superset z of z'. Therefore, if the system computes $S_i(z')$ and determines that $S_i(z')$ is high enough, the system does not have to compute $S_i(z)$ which by definition would have a score that is equal to or greater than the score for $S_i(z')$.

Therefore, the probability that distinct values stored by a person profile in a record field are stored by multiple person profiles in the same record field may be based on each set of distinct values that is stored by the multiple person profiles in the record field, and that has a count of distinct values which is at most a predetermined count. For example, the system saves significant amounts of storage by tracking only the probabilities of singletons such as $P_{city}$ (San Francisco) and $P_{city}$ (New York), and the probabilities of pairs such as $P_{city}$ (San Francisco, New York). However, the system would not need to track the probabilities of triplets such as $P_{city}$ (San Francisco, San Jose, New York), or quadruplets, or any other sets of distinct values that have a cardinality of more than 2. A set can be a group of items. A predetermined count can be a total number of items that is established in advance.

If Acme Corporation's 100K person profiles stored 9 distinct city names that included 8 San Francisco bay area cities and New York, then the system would need to track the probabilities for a total of 510 non-empty subsets, which is based on 1 subset of 9 cities, 9 subsets of 8 cities, 36 subsets of 7 cities, 84 subsets of 6 cities, 126 subsets of 5 cities, 126 subsets of 4 cities, 84 subsets of 3 cities, 36 subsets of 2 cities, and 9 subsets of 1 city. However, by truncating the subsets of distinct city names to only the subsets with a cardinality of 2 or less would result in the system needing to track the probabilities for only 45 subsets, which is based on 36 subsets of 2 cities and 9 subsets of 1 city, such that tracking the probabilities for only 45 subsets is a significant reduction from tracking the probabilities for 510 subsets. Furthermore, any pair of distinct city names that includes New York (and therefore the other city is in the bay area, such as San Jose) is likely to occur in very few (if any) profiles. Therefore, the number of profiles in which all 9 of these cities occur is not higher than the number of profiles in which {New York, San Jose} occurs. Consequently, the pair {New York, San Jose} having a high unusualness score implies that all set of city names that include New York also have a high unusualness score. If Acme Corporation's 100K person profiles stored 20 distinct city names, then the system would need to track the probabilities for a total of 1,048,576 non-empty subsets, but by truncating the subsets of distinct city names to only the subsets with a cardinality of 2 or less would result in the system needing to track the probabilities for only 191 subsets, which is a reduction of more than one million subsets.

Even if the system uses the lean model as described in Equation 6, the number of probabilities that need to be tracked can remain relatively large. A more drastic pruning, which can either be done following the pruning described in Equation (6) or independently, is to drop all values of z in which $S_i(z)$ is sufficiently small, which has the effect of replacing the actual score $S_i(0)$ by 0. Since the system's interest is in discovering person profiles in which at least one of the $S_i(z)$ values is relatively high, this replacement of relatively low probabilities by 0 will generally not impact the rank order of the discovered person profiles by much. However, this replacement of relatively low probabilities by 0 can drastically reduce the number of probabilities that the system needs to track. However, this drastic pruning does run the risk of dropping values that might contribute to unusual pairs. For example, since New York is a frequent value for the feature city, $S_{city}$ (New York) has a low unusualness score, such that the frequent tracking of the probability of the subset {New York} is dropped. However, if the tracking of all subsets that include New York are dropped, then all remaining subsets that include the 8 San Francisco bay area cities may have a low unusualness score.

FIG. 1 is an operational flow diagram illustrating a high-level overview of a method 100 for discovering suspicious person profiles. A model is trained to create a probability distribution of counts based on counts of distinct values stored by multiple person profiles in a record field, block 102. A system trains a probability distribution model based on a record field in multiple person profiles. For example, and without limitation, this can include the customer resolution engine extracting features from a training set of Acme Corporation's 100K person profiles, and training a model to build a probability distribution for the numbers of distinct email addresses in each person profile, which indicates that 66% of these profiles store 1 distinct email address, 33% of these profiles store 2 distinct email addresses, and 1% of these profiles store 3 distinct email addresses.

In addition to training to create a probability distribution based on one record field, the model is trained to create another probability distribution of counts based on other counts of other distinct values stored by the multiple person profiles in another record field, block 104. The system trains the probability distribution model based on another record field in the multiple person profiles. By way of example and without limitation, this can include the customer resolution engine also training the model to build a probability distribution for the numbers of distinct last names in each person profile, which indicates that 80% of these profiles store 1 distinct last name and 20% of these profiles store 2 distinct last names.

After the model is trained, the count of distinct values stored by an individual person profile in the record field is identified, block 106. The system counts the values in one of a profile's record fields. In embodiments, this can include the customer resolution engine identifying that Chris Carter's person profile stores 4 distinct email addresses.

Following the model being trained, another count of distinct values stored by the individual person profile in the other record field is identified, block 108. The system counts the values in another one of the profile's record fields. For example, and without limitation, this can include the customer resolution engine identifying that Carter's person profile stores 3 distinct phone numbers.

Having identified a count of distinct values in one of an individual person profile's record fields, a score is determined using a cumulative distribution function of the count under the probability distribution of counts, block 110. The system calculates the unusualness score for one of the profile's record fields. By way of example and without limitation, this can include the customer resolution engine applying the cumulative distribution function to the count of Carter's 4 email addresses under the probability distribution for the number of email addresses to determine the unusualness score of 2.76 for the count of Carter's 4 email addresses.

Subsequent to identifying another count of distinct values in another one of the individual person profile's record fields, another score is determined using the cumulative distribution function of the other count under the other probability distribution of counts, block 112. The system calculates another unusualness score for another one of the profile's record fields. In embodiments, this can include the customer resolution engine. applying the cumulative distribution function to the count of Carter's 3 phone numbers under the probability distribution for the number of phone numbers to determine the unusualness score of 0.77 for the count of Carter's 3 phone numbers.

After determining the score and the other score, the score and the other score are combined in an overall score, block 114. The system aggregates the unusualness scores for a profile. For example, and without limitation, this can include the customer resolution engine combining the unusualness score of 2.76 for the count of Carter's 4 email addresses with the unusualness score of 0.77 for the count of Carter's 3 phone numbers to result in the overall score of 3.53 for Carter's profile.

Following the combination of the score and the other score in the overall score, a determination is made whether the overall score satisfies a threshold, block 116. The system determines if an overall unusualness score for a profile is unusual enough. By way of example and without limitation, this can include the customer resolution engine comparing the overall score of 3.53 for Carter's profile against an unusualness threshold of 3.0.

If the score and the other score are combined in an overall score that satisfies a threshold, a message is output about the person profile being suspected of corruption, block 118. The system outputs the identification of a suspicious profile. In embodiments, this can include the customer resolution engine outputting a message about Chris Carter's person profile being suspected of corruption because the overall score of 3.53 for Carter's profile is greater than the unusualness threshold of 3.0.

The method 100 may be repeated as desired. Although this disclosure describes the blocks 102-118 executing in a particular order, the blocks 102-118 may be executed in a different order. In other implementations, each of the blocks 102-118 may also be executed in combination with other blocks and/or some blocks may be divided into a different set of blocks.

System Overview

Figure 2:
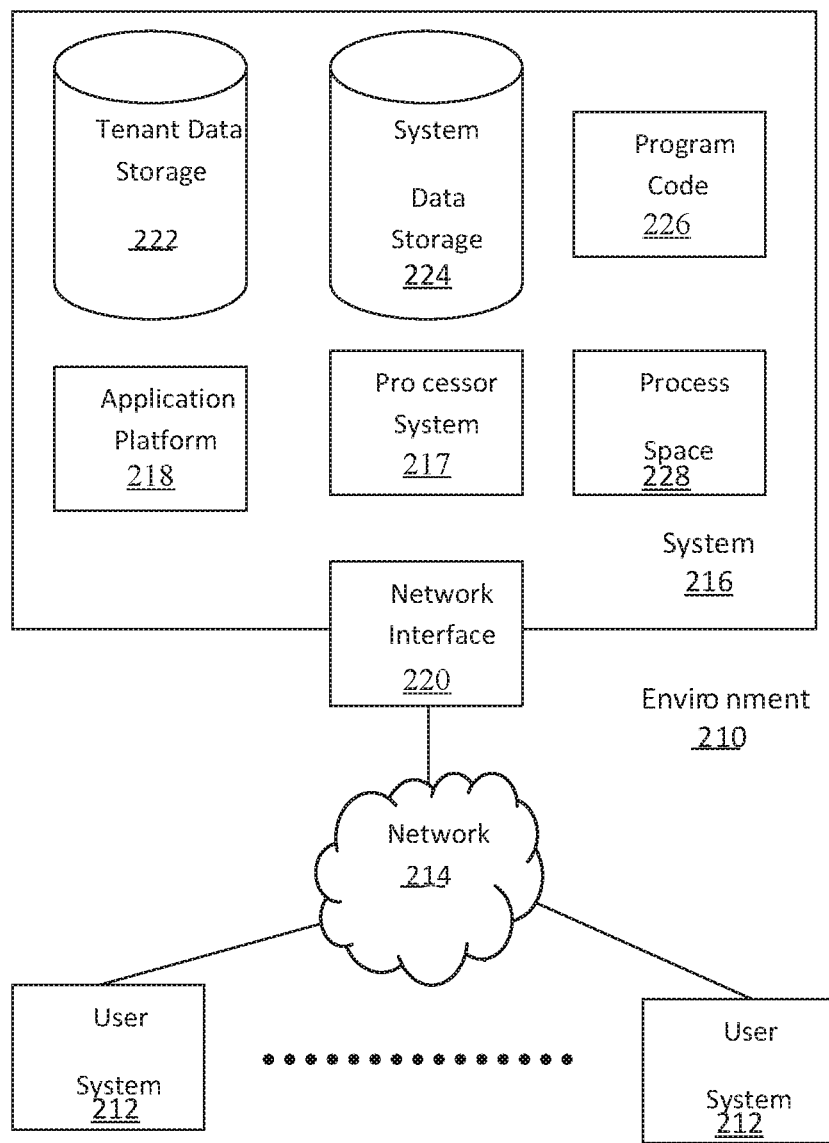
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a workstation, and/or a network of computing devices. As illustrated in FIG. 2 (and in more detail in FIG. 4) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 3:
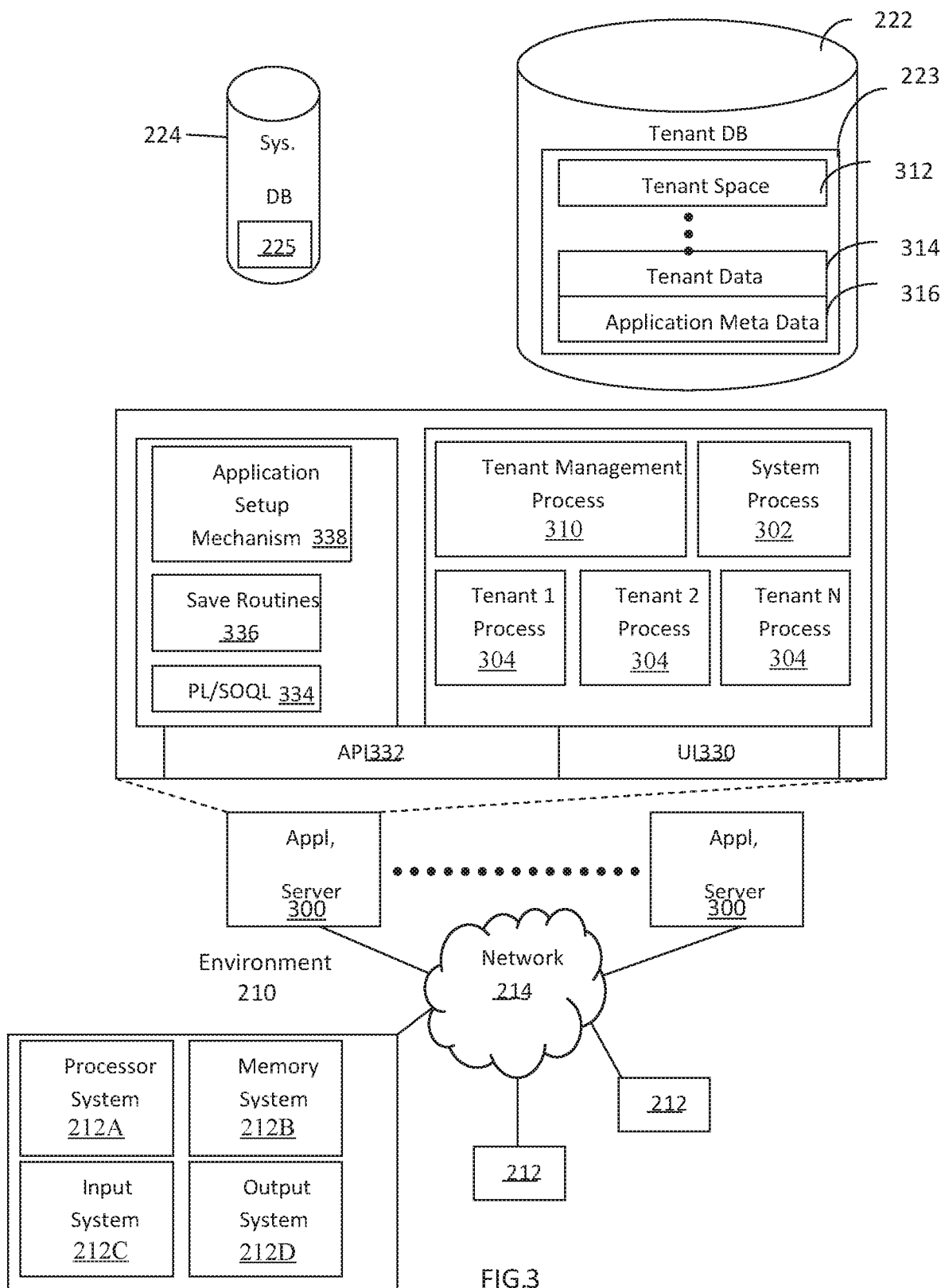
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which may be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also may be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for discovering suspicious person profiles, the system comprising:
   one or more processors; and
   a non-transitory computer readable medium storing a plurality of instructions, which when executed, cause the one or more processors to:
   train a model to create a probability distribution of counts based on a count of distinct values stored in a record field by each of a plurality of person profiles;
   train the model to create another probability distribution of counts based on another count of other distinct values stored in another record field by each of the plurality of person profiles;
   identify a count of distinct values stored in the record field by a person profile;
   identify another count of distinct values stored in the other record field by the person profile;
   determine a score based on a cumulative distribution function of the count under the probability distribution of counts;
   determine another score based on the cumulative distribution function of the other count under the other probability distribution of counts;
   determine whether the score and the other score combine in an overall score, for the person profile, which satisfies a threshold; and
   output a message about the person profile being suspected of corruption, in response to a determination that the overall score exceeds the threshold.

2. The system of claim 1, wherein the distinct values comprise one of telephone numbers, telephone number region codes, email addresses, email address domains, and personal family names.

3. The system of claim 1, wherein the probability distribution of counts further comprises pseudo counts generated from a parametric probability distribution that is based on a parameter that is estimated from the probability distribution of counts.

4. The system of claim 1, wherein the score comprises a normalized score and the other score comprises another normalized score.

5. The system of claim 1, wherein the overall score is based on a weight applied to the score and another weight applied to the other score, the weight and the other weight having been learned by a machine-learning model in response to receiving human feedback that evaluates whether a historical person profile is corrupted.

6. The system of claim 1, wherein the overall score further comprises an additional score that is based on a probability that the other distinct values stored by the person profile in the other record field are stored by the plurality of person profiles in the other record field.

7. The system of claim 6, wherein the probability is based on each set of distinct values that is stored by a corresponding one of the plurality of person profiles in the other record field, and that has a count of distinct values which is at most a predetermined count.

8. A computer program product comprising computer-readable program code to be executed by one or more processors when retrieved from a non-transitory computer-readable medium, the program code including instructions to:
   train a model to create a probability distribution of counts based on a count of distinct values stored in a record field by each of a plurality of person profiles;
   train the model to create another probability distribution of counts based on another count of other distinct values stored in another record field by each of the plurality of person profiles;
   identify a count of distinct values stored in the record field by a person profile;
   identify another count of distinct values stored in the other record field by the person profile;
   determine a score based on a cumulative distribution function of the count under the probability distribution of counts;
   determine another score based on the cumulative distribution function of the other count under the other probability distribution of counts;
   determine whether the score and the other score combine in an overall score, for the person profile, which satisfies a threshold; and
   output a message about the person profile being suspected of corruption, in response to a determination that the overall score exceeds the threshold.

9. The computer program product of claim 8, wherein the distinct values comprise one of telephone numbers, telephone number region codes, email addresses, email address domains, and personal family names.

10. The computer program product of claim 8, wherein the probability distribution of counts further comprises pseudo counts generated from a parametric probability distribution that is based on a parameter that is estimated from the probability distribution of counts.

11. The computer program product of claim 8, wherein the score comprises a normalized score and the other score comprises another normalized score.

12. The computer program product of claim 8, wherein the overall score is based on a weight applied to the score and another weight applied to the other score, the weight and the other weight having been learned by a machine-learning model in response to receiving human feedback that evaluates whether a historical person profile is corrupted.

13. The computer program product of claim 8, wherein the overall score further comprises an additional score that is based on a probability that the other distinct values stored by the person profile in the other record field are stored by the plurality of person profiles in the other record field.

14. The computer program product of claim 13, wherein the probability is based on each set of distinct values that is stored by a corresponding one of the plurality of person profiles in the other record field, and that has a count of distinct values which is at most a predetermined count.

15. A method for discovering suspicious person profiles, the method comprising:
- training a model to create a probability distribution of counts based on a count of distinct values stored in a record field by each of a plurality of person profiles;
- training the model to create another probability distribution of counts based on another count of other distinct values stored in another record field by each of the plurality of person profiles;
- identifying a count of distinct values stored in the record field by a person profile;
- identifying another count of distinct values stored in the other record field by the person profile;
- determining a score based on a cumulative distribution function of the count under the probability distribution of counts;
- determining another score based on the cumulative distribution function of the other count under the other probability distribution of counts;
- determining whether the score and the other score combine in an overall score, for the person profile, which satisfies a threshold; and
- outputting a message about the person profile being suspected of corruption, in response to a determination that the overall score exceeds the threshold.

16. The method of claim 15, wherein the distinct values comprise one of telephone numbers, telephone number region codes, email addresses, email address domains, and personal family names.

17. The method of claim 15, wherein the probability distribution of counts further comprises pseudo counts generated from a parametric probability distribution that is based on a parameter that is estimated from the probability distribution of counts.

18. The method of claim 15, wherein the score comprises a normalized score and the other score comprises another normalized score.

19. The method of claim 15, wherein the overall score is based on a weight applied to the score and another weight applied to the other score, the weight and the other weight having been learned by a machine-learning model in response to receiving human feedback that evaluates whether a historical person profile is corrupted.

20. The method of claim 15, wherein the overall score further comprises an additional score that is based on a probability that the other distinct values stored by the person profile in the other record field are stored by the plurality of person profiles in the other record field, and the probability is based on each set of distinct values that is stored by a corresponding one of the plurality of person profiles in the other record field, and that has a count of distinct values which is at most a predetermined count.

* * * * *